United States Patent
Zhao et al.

(10) Patent No.: US 9,835,791 B2
(45) Date of Patent: Dec. 5, 2017

(54) DISPLAY APPARATUS AND PANEL FIXING DEVICE THEREOF

(71) Applicant: Radiant Opto-Electronics Corporation, Kaohsiung (TW)

(72) Inventors: Yong-Wei Zhao, Kaohsiung (TW); Li-Hui Chen, Kaohsiung (TW); Wei-Chung Lu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 14/844,637

(22) Filed: Sep. 3, 2015

(65) Prior Publication Data
US 2016/0073536 A1    Mar. 10, 2016

(30) Foreign Application Priority Data

Sep. 4, 2014   (TW) .............................. 103130586 A

(51) Int. Cl.
 *F21V 7/04* (2006.01)
 *F21V 8/00* (2006.01)
 *G02F 1/1333* (2006.01)

(52) U.S. Cl.
 CPC ......... *G02B 6/0081* (2013.01); *G02B 6/0088* (2013.01); *G02F 1/133308* (2013.01); *G02F 2001/13332* (2013.01); *G02F 2001/133314* (2013.01); *G02F 2201/46* (2013.01); *G02F 2201/465* (2013.01)

(58) Field of Classification Search
 CPC ............... G02B 6/0081; G02B 6/0088; G02F 1/133308; G02F 2201/46; G02F 2001/133322; G02F 2001/133314; G02F 2001/13332; G02F 2201/465
 See application file for complete search history.

(56) References Cited

U.S. PATENT DOCUMENTS

| | | | |
|---|---|---|---|
| 8,770,815 B2 * | 7/2014 | Hardacker | H04N 5/64 362/605 |
| 2009/0207126 A1 | 8/2009 | Arisato | |
| 2011/0260959 A1* | 10/2011 | Son | G02F 1/133308 345/102 |
| 2012/0300434 A1* | 11/2012 | Tien | G02F 1/133308 362/97.1 |

(Continued)

FOREIGN PATENT DOCUMENTS

| | | |
|---|---|---|
| CN | 1246637 A | 3/2000 |
| CN | 101960206 A | 1/2011 |
| CN | 102629006 A | 8/2012 |

(Continued)

*Primary Examiner* — Y M. Lee
(74) *Attorney, Agent, or Firm* — Muncy, Geissler, Olds & Lowe, P.C.

(57) ABSTRACT

A display apparatus includes a back plate having a rear wall and a peripheral wall that cooperatively define an accommodation space, a light guide plate disposed in the accommodation space, a display panel disposed in the accommodation space forwardly of the light guide plate, a plurality of stacked optical films disposed between the light guide plate and the display panel, and a panel fixing device including a first limiting unit and a second limiting unit that cooperate with each other to clamp and fix a peripheral edge portion of the display panel therebetween.

13 Claims, 9 Drawing Sheets

(56) References Cited

U.S. PATENT DOCUMENTS

2013/0155717 A1\* 6/2013 Jeong et al. ...... G02F 1/133308
362/602
2015/0085221 A1\* 3/2015 Zhang ...................... H05K 5/02
362/611

FOREIGN PATENT DOCUMENTS

| CN | 102809132 A | 12/2012 |
|---|---|---|
| CN | 102809837 A | 12/2012 |
| CN | 103777400 A | 5/2014 |
| CN | 203705745 U | 7/2014 |
| JP | 2013-11854 A | 1/2013 |
| TW | M458566 U1 | 8/2013 |
| TW | 201335671 A1 | 9/2013 |
| TW | 201346383 A | 11/2013 |

\* cited by examiner

DISPLAY APPARATUS AND PANEL FIXING DEVICE THEREOF

CROSS REFERENCE TO RELATED APPLICATION

This application claims priority of Taiwanese Application Number 103130586, filed on Sep. 4, 2014, the disclosure of which is incorporated herein by reference.

FIELD

The disclosure relates to a display apparatus, more particularly to a display apparatus having a panel fixing device that is beneficial for reducing the thickness thereof.

BACKGROUND

Referring to FIG. 1, a conventional display apparatus 1 is shown to comprise a back plate 11 which includes a peripheral wall 111 having an engagement portion 110, a light guide plate 12 mounted on the back plate 11 within the peripheral wall 111, a frame 13 that is spaced apart from the light guide plate 12, that is engaged to the peripheral wall 111 of the back plate and that has a portion protruding out of the peripheral wall 111, a display panel 14 mounted on the frame 13, and a front bezel 15 that covers the frame 13, that is engaged to the engagement portion 110 and that cooperates with the frame 13 to limit and fix the display panel 14.

However, in the conventional display apparatus 1, the frame 13 must cooperate with the front bezel 15 to limit the display panel 14 therebetween. Because the front bezel 15 is disposed on and covers the outer side of the peripheral wall 111 of the back plate 11 and a front side of the frame 13, the thickness of the display apparatus 1 is increased. This does not conform to the trend of thinning the display apparatus.

SUMMARY

Therefore, an object of the disclosure is to provide a display apparatus having a panel fixing device that is beneficial to reducing the thickness of the display apparatus.

Accordingly, a display apparatus of the disclosure comprises a back plate, a light guide plate, a display panel, a plurality of stacked optical films, and a panel fixing device. The back plate includes a rear wall and a peripheral wall extending forwardly from and cooperating with the rear wall to define an accommodation space. The light guide plate is disposed in the accommodation space. The display panel is disposed in the accommodation space forwardly of the light guide plate. The stacked optical films are disposed between the light guide plate and the display panel. The panel fixing device includes a first limiting unit and a second limiting unit that cooperate with each other to clamp and fix a peripheral edge portion of the display panel therebetween.

Another object of this disclosure is to provide a panel fixing device that is beneficial to reducing the thickness of a display apparatus.

Accordingly, a panel fixing device of this disclosure for clamping a display panel of a display apparatus comprises a first limiting unit configured to cover a peripheral part of a front surface of the display panel, and a second limiting unit cooperating with said first limiting unit for clamping and fixing the display panel therebetween.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
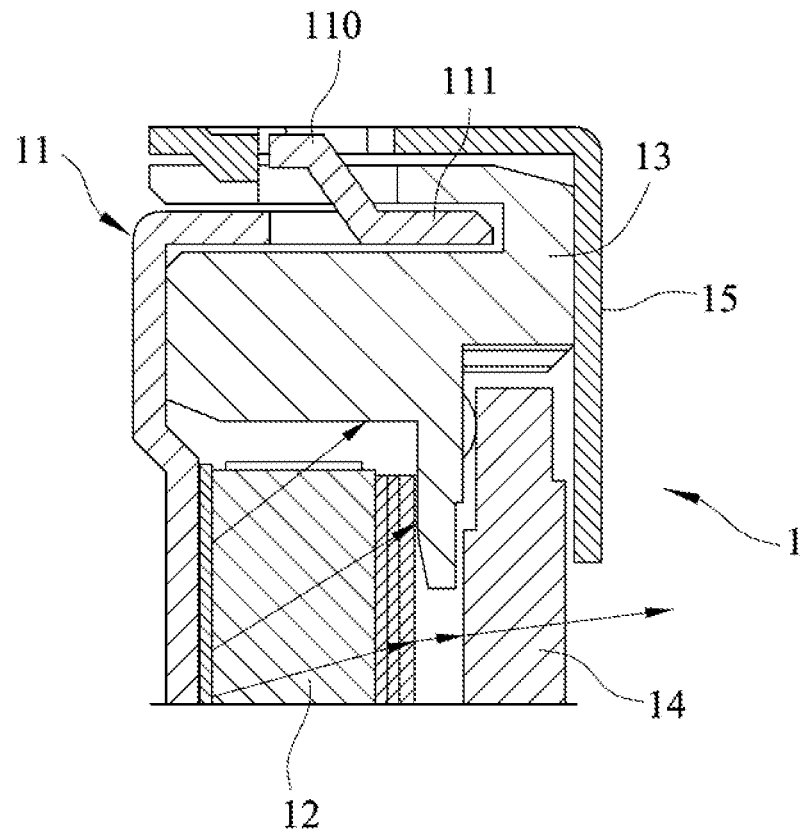
FIG. 1 is a fragmentary side sectional view of a conventional display apparatus.

Before the present disclosure is described in greater detail with reference to the accompanying embodiments, it should be noted herein that like elements are denoted by the same reference numerals throughout the disclosure.

Referring to FIGS. 2 to 5, a display apparatus 2 according to the first embodiment of the present disclosure is shown to comprise a back plate 3 defining an accommodation space 30, a light guide plate 4 disposed in the accommodation space 30, a display panel 5 disposed in the accommodation space 30 forwardly of the light guide plate 4, a plurality of stacked optical films 6 disposed between the light guide plate 4 and the display panel 5, and a panel fixing device 7 installed around the display panel 5.

The back plate 3 includes a rear wall 31, and a peripheral wall 32 extending forwardly from a periphery of the rear wall 31 and cooperating with the rear wall 31 to define the accommodation space 30.

The panel fixing device 7 includes a first limiting unit 71 and a second limiting unit 72 both disposed in the accommodation space 30. The first limiting unit 71 includes a first limiting member 710 disposed inside of the peripheral wall 32 and covers a peripheral part of a front surface of the display panel 5. The second limiting unit 72 includes a plurality of spaced-apart second limiting members 720 disposed inside of the first limiting member 710 and covers a peripheral part of a rear surface of the display panel 5. The first limiting member 710 and the second limiting members 720 cooperate with each other to clamp and fix a peripheral edge portion of the display panel 5 therebetween. The first limiting member 710 is made of a light-transmitting soft material, whereas each of the second limiting members 720 is made of a light-shading soft material. In this embodiment, the frame 13 of the conventional display apparatus 1 (see FIG. 1) is removed herein. Further, the first limiting member 710 is made of light-transmitting plastic or rubber for light propagation, as shown in FIG. 4, and each second limiting member 720 is made of light-shading plastic or rubber to reduce leakage of light through the lateral sides of the display panel 5 so that the brightness of the display apparatus 2 can be increased.

Figure 2:
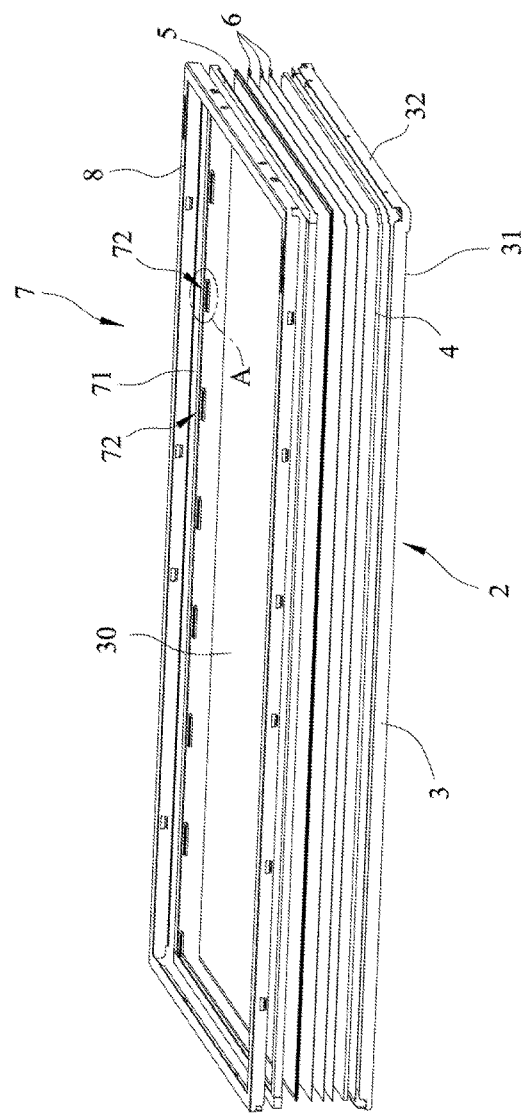
FIG. 2 is an exploded perspective view of a display apparatus according to the first embodiment of the present disclosure.
Figure 3:
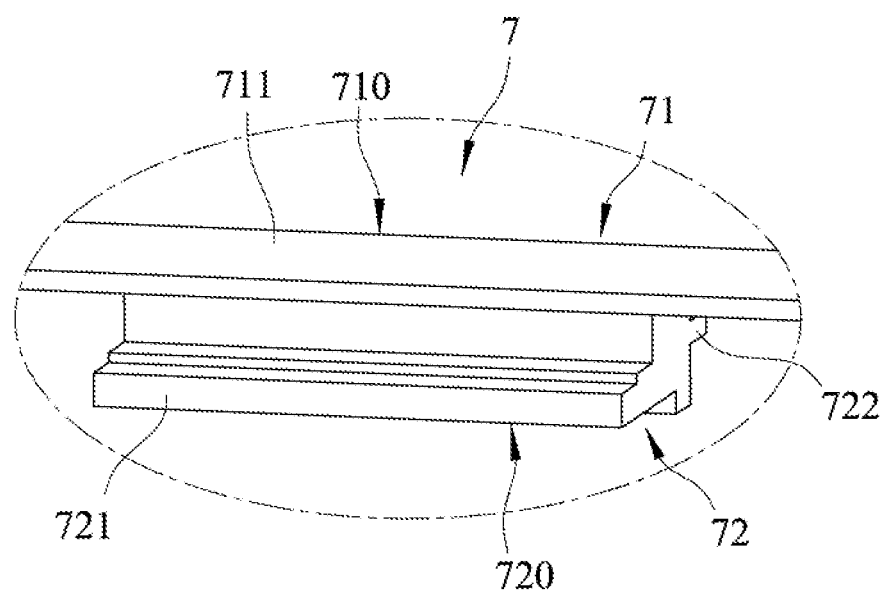
FIG. 3 is an enlarged perspective view of an encircled portion (A) of FIG. 2.
Figure 5:
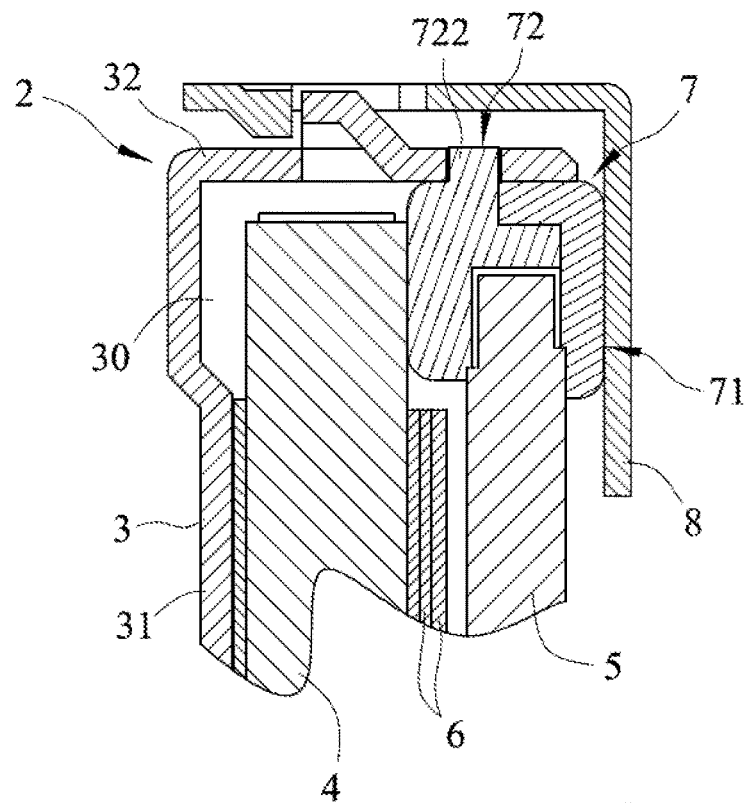
FIG. 5 is a fragmentary side sectional view of the first embodiment in an assembled state.

It should be noted herein that the first limiting member 710 and the second limiting members 720 may be coupled by gluing or may be integrally formed as one body. The panel fixing device 7 may optionally include a front bezel 8, as shown in FIGS. 2 and 5, to enhance the fixing and limiting effects thereof. The first limiting member 710 includes a first stop portion 711 parallel to the display panel 5 and abutting against the peripheral part of the front surface of the display panel 5, and a first extending portion 713 extending transversely from the first stop portion 711 toward the second limiting member 720 and that abuts against an inner surface of the peripheral wall 32. Each of the second limiting members 720 includes a second stop portion 721 that extends between and that is parallel to the light guide plate 4 and the display panel 5 and that abuts against the peripheral part of the rear surface of the display panel 5 and a peripheral part of a front surface of the light guide plate 4, a fixing portion 722 that extends oppositely from the second stop portion 721 into the peripheral wall 32 of the back plate 3, and a second extending portion 724 that extends transversely from the second stop portion 721 toward the first limiting member 710 and that abuts against an inner side of the first extending portion 713. In this embodiment, the fixing portion 722 is configured as column, but is not limited thereto. The first stop portion 711 cooperates with the second stop portions 721 of the second limiting members 720 to clamp the peripheral edge portion of the display panel 5 therebetween.

Figure 6:
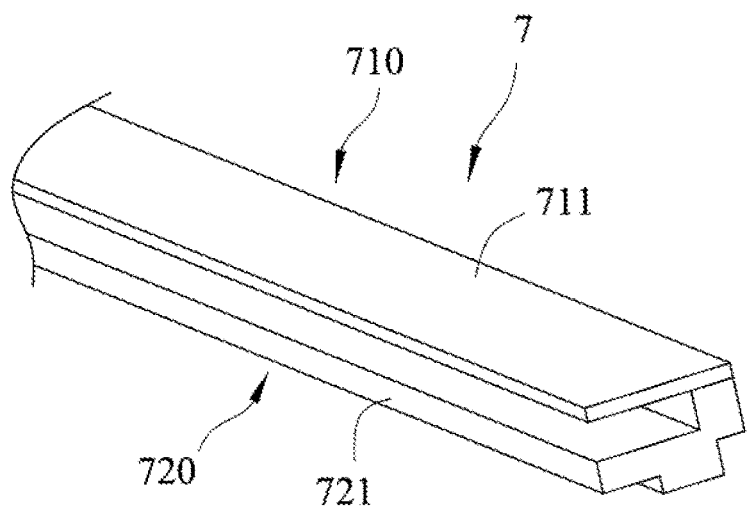
FIG. 6 is a fragmentary perspective view of an alternative form of a second limiting unit of a panel fixing device of the first embodiment.
Figure 7:
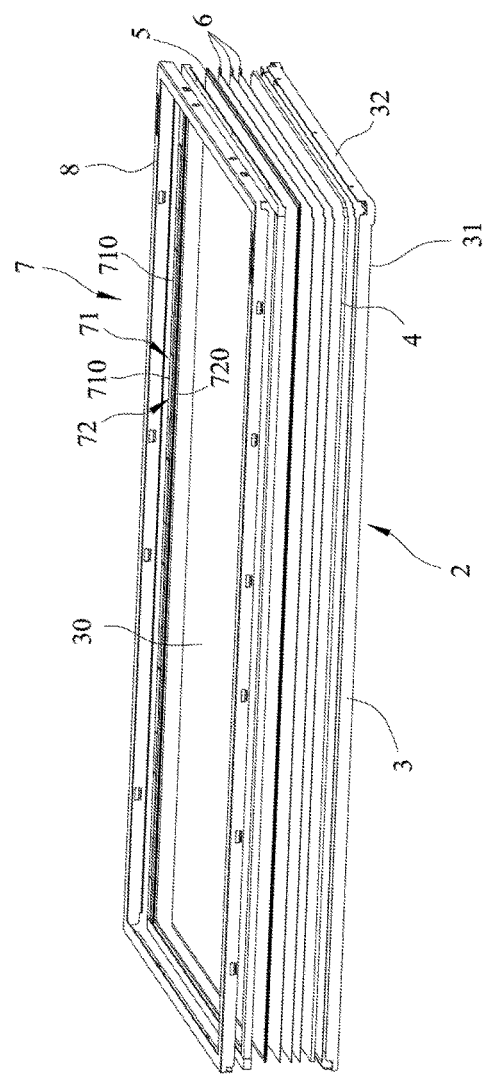
FIG. 7 is a view similar to FIG. 2, but illustrating alternative forms of the first and the second limiting units of the first embodiment.
Figure 8:
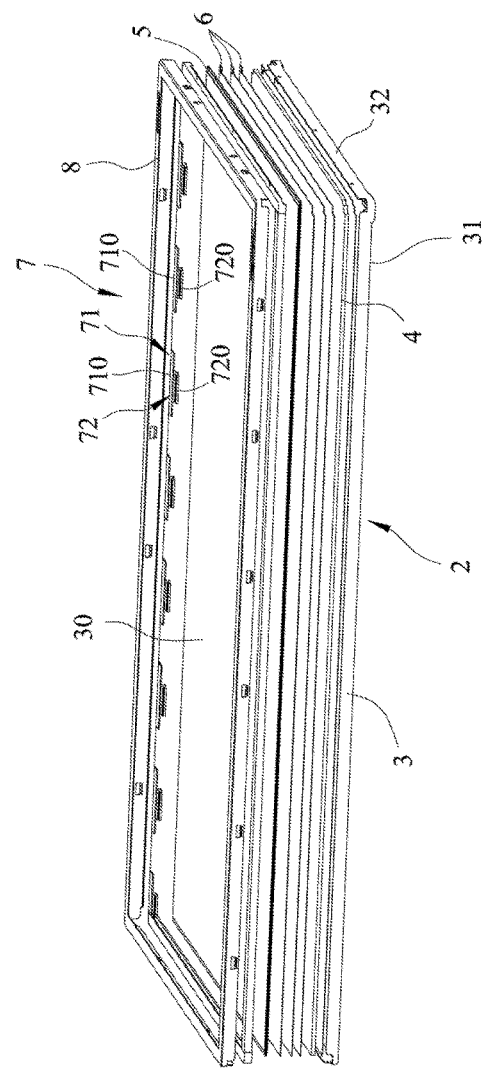
FIG. 8 is a view similar to FIG. 2, but illustrating another alternative form of the first limiting unit of the first embodiment.

It should be noted herein that there may only be one second limiting member 720, as shown in FIG. 6, which may similarly cooperate with the first limiting member 710 to clamp the display panel 5 therebetween. Further, there may be a plurality of the first limiting members 710 with one second limiting member 720, as shown in FIG. 7, or a plurality of the first limiting members 710 and a plurality of the second limiting members 720, as shown in FIG. 8.

Figure 4:
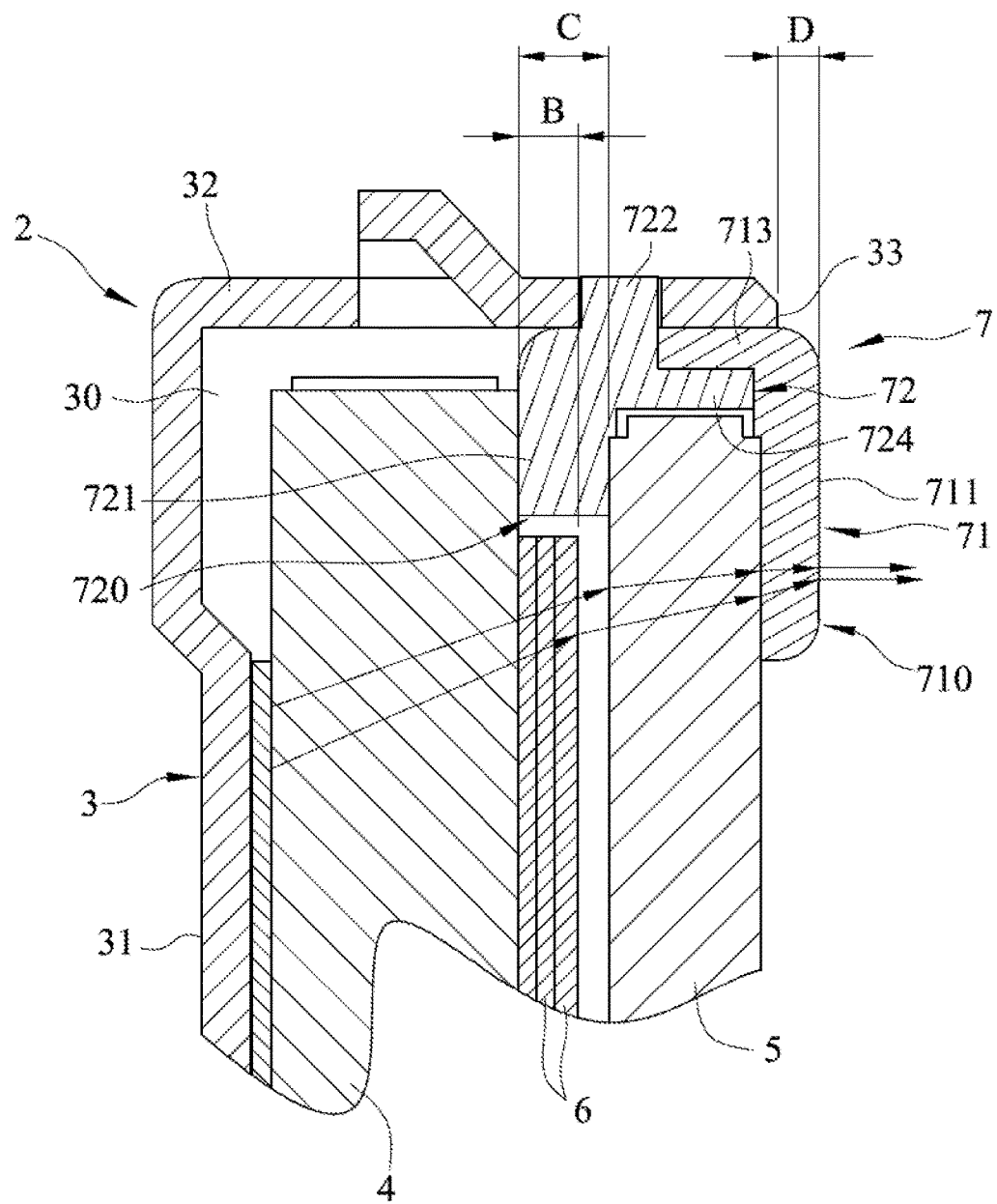
FIG. 4 is an enlarged fragmentary side sectional view of the first embodiment in an assembled state, but without a front bezel.

As shown in FIG. 4, the total thickness (B) of the stacked optical films 6 is smaller than the thickness (C) of the second stop portion 721 that is disposed between the light guide plate 4 and the display panel 5, so that the optical films 6 can be stacked on the light guide plate 4 without contacting the display panel 5. By this way, foreign residues on the surface of an outermost one of the stacked optical films 6 or an uneven surface of the outermost optical film 6 can be prevented from frictionally contacting and scratching the display panel 5. The distance (D) from an outer edge of the first stop portion 711 to an outer edge 33 of the peripheral wall 32 of the back plate 3 is larger than or equal to 0.3 cm for maintaining the structural strength.

To assemble the display apparatus 2, if the first limiting member 710 and the second limiting members 720 are not integrally formed, the first limiting member 710 and the second limiting members 720 are first coupled to each other, and then clamp the display panel 5 therebetween. Afterwards, the assembly of the panel fixing device 7 and the display panel 5 are placed in the accommodation space 30 such that the fixing portions 722 of the second limiting members 720 are engaged to the peripheral wall 32 of the back plate 3. The display panel 5 may be pressed into the space between the first limiting member 710 and the second limiting members 720, or the first limiting member 710 and the second limiting members 720 may be processed beforehand into a shape that suits the placement of the display panel 5.

Light passing through the light guide plate 4 can penetrate the first stop portion 711 and project outward to increase the viewable range. However, the light cannot penetrate the second stop portion 721 so that the leakage of light through the lateral sides of the display panel 5 can be reduced. When the display panel 5 receives an impact, because the first limiting member 710 and the second limiting members 720 are made of resilient plastic or rubber, buffering and protecting effects are provided. The panel fixing device 7 is coupled to the inner side of the back plate 3, so that the overall thickness of the display apparatus 2 can be reduced, thereby meeting the demand for thinning the display apparatus. Further, the front bezel 8 is optional, unlike the front bezel 15 (see FIG. 1) of the prior art which is necessary for fixing purposes, so that the issue of having no common front bezel for different sizes of the display apparatuses 2 can be resolved.

Figure 9:
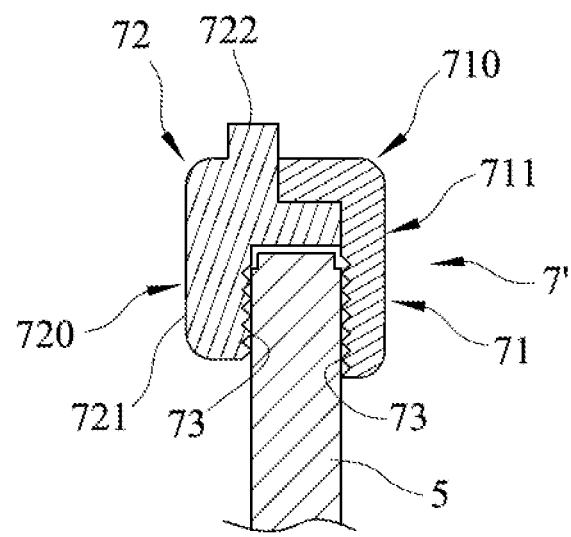
FIG. 9 is an assembled fragmentary side sectional view of a panel fixing device and a display panel of a display apparatus according to the second embodiment of this disclosure.

FIG. 9 illustrates how the display panel 5 is clamped by a panel fixing device 7' of a display apparatus 2 according to the second embodiment of this disclosure. In this embodiment, the first stop portion 711 of the first limiting member 710 is provided with a friction microstructure region 73 at a side that faces the display panel 5, and the second stop portion 721 of each of the second limiting members 720 (only one is shown in FIG. 9) is also provided with a friction microstructure region 73 at a side that faces the display panel 5. The friction microstructure region 73 may include a plurality of outwardly projecting protrusions or ribs, but is not limited as such. Through this configuration, when the first limiting member 710 and the second limiting members 720 clamp the display panel 5, the protrusions or ribs of the friction microstructure region 73 of the first stop portion 711 are in frictional contact with the front surface of the display panel 5, while the protrusions or ribs of the friction microstructure region 73 of the second stop portion 721 are in frictional contact with the rear surface of the display panel 5, thereby preventing sliding movement of the display panel 5. Hence, the strength of fixing the display panel 5 can be enhanced.

Figure 10:
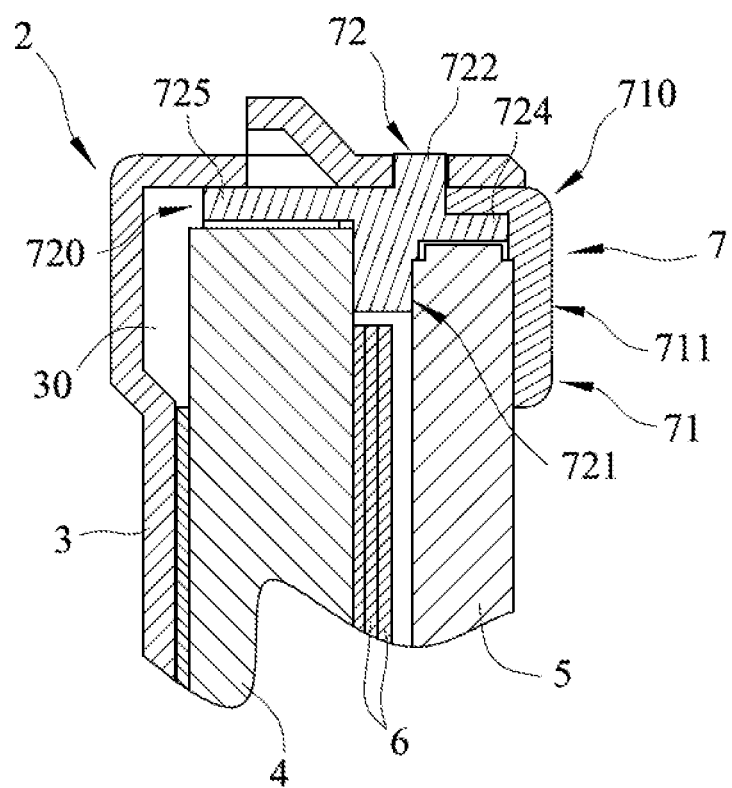
FIG. 10 is a fragmentary side sectional view of a display apparatus according to the third embodiment of this disclosure.
Figure 11:
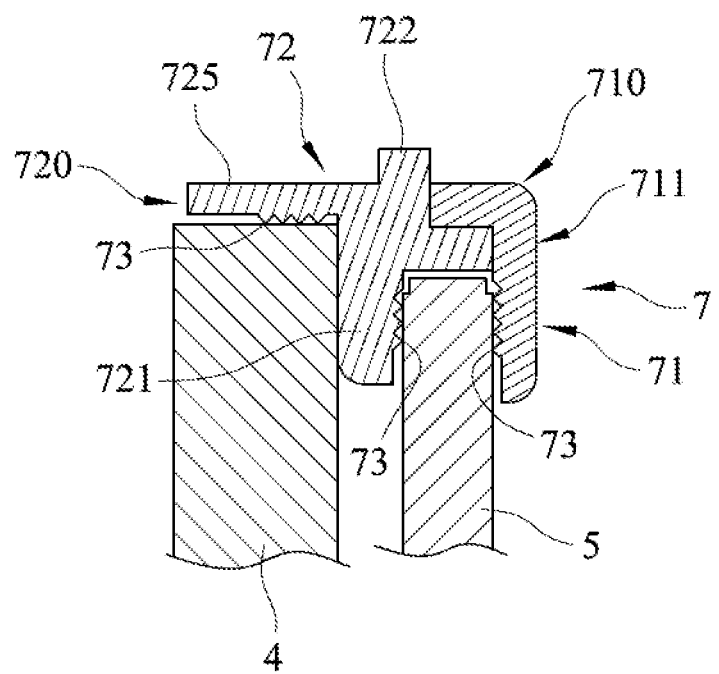
FIG. 11 illustrates an alternative form of a panel fixing device of the third embodiment.

Referring to FIG. 10, the third embodiment of the display apparatus 2 according to this disclosure is generally identical to the first embodiment, and only differs in that, in the third embodiment, each of the second limiting members 720 further includes an extension portion 725 that extends transversely from the second stop portion 721 in a direction opposite to the second extending portion 724 and that is disposed between the peripheral wall 32 of the back plate 3 and the light guide plate 4. The extension portion 725 abuts against the light guide plate 4 to protect the same. Referring to FIG. 11, it is worth to mention herein that, in this embodiment, each of the first stop portion 711 and the second stop portion 721 may be provided with a friction microstructure region 73 at a side that faces the display panel 5, while the extension portion 725 may be provided with a friction microstructure region 73 at a side that faces the light guide plate 4. The friction microstructure region 73 may be similar to that described in the second embodiment.

In sum, by disposing the first limiting member 710 and the second limiting members 720 at the inner side of the peripheral wall 32 of the back plate 3, the thickness of the display apparatus 2 can be reduced and hence the purpose of thinning the display apparatus 2 is served. Furthermore, the panel fixing device 7, 7' is directly used, and does not need to cooperate with the front bezel 8, to clamp the display panel 5 therebetween, so that the issue of having no common front bezel for different sizes of the display apparatuses 2 can be resolved. Moreover, because the first and second limiting members 710, 720 have different light transmission, the effects of increasing the viewable range of the display panel 5 and decreasing the leakage of light through the lateral sides of the display panel 5 can both be achieved. Additionally, the present disclosure has many variations to enhance the engagement and protection strengths according to the requirements and to enhance its wide usage. Therefore, the object of this disclosure can be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A display apparatus comprising:
   a back plate including a rear wall and a peripheral wall extending forwardly from and cooperating with said rear wall to define an accommodation space;
   a light guide plate disposed in said accommodation space;
   a display panel disposed in said accommodation space forwardly of said light guide plate;
   a plurality of stacked optical films disposed between said light guide plate and said display panel; and
   a panel fixing device including an outer limiting unit and an inner limiting unit that cooperate with each other to clamp and fix a peripheral edge portion of said display panel therebetween,
   wherein said outer limiting unit is made of a light-transmitting material, and said inner limiting unit is made of a light-shading material,
   wherein said inner limiting unit includes a plurality of inner limiting members arranged at intervals along the peripheral edge portion of said display panel, and
   wherein each of said inner limiting members includes a friction microstructure region provided on a side that faces said display panel, and each of said inner limiting members further includes a fixing portion that extends from an inner stop portion and that is coupled to said peripheral wall of said back plate.

2. The display apparatus of claim 1, wherein said outer limiting unit and said inner limiting unit are integrally formed as one body.

3. The display apparatus of claim 1, wherein said outer limiting unit includes an outer limiting member disposed inside of said peripheral wall of said back plate and covering a peripheral part of a front surface of said display panel.

4. The display apparatus of claim 3, wherein inner limiting members are disposed on an inner side of said outer limiting member.

5. The display apparatus of claim 3, wherein said outer limiting member includes an outer stop portion parallel to said display panel and abutting against said peripheral part of said front surface of said display panel.

6. The display apparatus of claim 5, wherein said outer limiting member further includes an outer extending portion extending transversely from said outer stop portion toward said inner limiting members.

7. The display apparatus of claim 3, wherein said outer limiting member includes a friction microstructure region provided on a side that faces said display panel.

8. The display apparatus of claim 1, wherein said outer limiting unit includes a plurality of outer limiting members disposed inside of said peripheral wall of said back plate and covering a peripheral part of a front surface of said display panel.

9. A display apparatus comprising:
   a back plate including a rear wall and a peripheral wall extending forwardly from and cooperating with said rear wall to define an accommodation space;
   a light guide plate disposed in said accommodation space;
   a display panel disposed in said accommodation space forwardly of said light guide plate;
   a plurality of stacked optical films disposed between said light guide plate and said display panel; and
   a panel fixing device including an outer limiting unit and an inner limiting unit that cooperate with each other to clamp and fix a peripheral edge portion of said display panel therebetween;
   wherein said outer limiting unit is made of a light-transmitting material, and said inner limiting unit is made of a light-shading material,
   wherein said inner limiting unit includes a plurality of inner limiting members arranged at intervals along the peripheral edge portion of said display panel, and
   wherein each of said inner limiting members includes an inner stop portion that is located between and that is parallel to said light guide plate and said display panel and that abuts against a rear surface of said display panel, and each of said inner limiting members further includes a fixing portion that extends from said inner stop portion and that is coupled to said peripheral wall of said back plate.

10. The display apparatus of claim 9, wherein each of said inner limiting members further includes a fixing portion that extends from said inner stop portion and that is coupled to said peripheral wall of said back plate.

11. The display apparatus of claim 10, wherein said extension portion includes a friction microstructure region provided on a side that faces said light guide plate.

12. The display apparatus of claim 9, wherein the thickness of said inner stop portion is larger than the total thickness of said stacked optical films.

13. The display apparatus of claim 9, wherein each of said inner limiting members further includes an inner extending portion extending transversely from said inner stop portion.

* * * * *